United States Patent [19]

von Sengbusch

[11] Patent Number: 5,192,440
[45] Date of Patent: Mar. 9, 1993

[54] HOLLOW CELLULOSE DIALYSIS FIBERS

[75] Inventor: Gunter von Sengbusch, Wuppertal, Fed. Rep. of Germany

[73] Assignee: Akzo N.V., Netherlands

[21] Appl. No.: 798,897

[22] Filed: Nov. 27, 1991

[30] Foreign Application Priority Data

Nov. 30, 1990 [DE] Fed. Rep. of Germany ....... 4038247

[51] Int. Cl.$^5$ ...................... B01D 71/10; B01D 71/12
[52] U.S. Cl. .................................. 210/500.29; 264/41
[58] Field of Search ...................... 210/500.43, 500.29; 264/41, 45.2, DIG. 48, DIG. 62

[56] References Cited

U.S. PATENT DOCUMENTS

| | | |
|---|---|---|
| 4,164,437 | 8/1979 | Henne et al. |
| 4,322,381 | 3/1982 | Joh |
| 4,323,627 | 4/1982 | Joh .................................. 210/500.43 |
| 4,604,326 | 8/1986 | Manabe et al. |
| 4,822,540 | 4/1989 | Manabe et al. |
| 4,919,809 | 4/1990 | Yamamoto et al. |

FOREIGN PATENT DOCUMENTS

| | | |
|---|---|---|
| 1171615 | 7/1984 | Canada. |
| 0042517 | 12/1981 | European Pat. Off. |
| 0076442 | 4/1983 | European Pat. Off. |
| 0126994B1 | 12/1984 | European Pat. Off. |
| 0135593A1 | 4/1985 | European Pat. Off. |
| 0175948A2 | 4/1986 | European Pat. Off. |
| 0351773A2 | 1/1990 | European Pat. Off. |
| 2328853 | 12/1973 | Fed. Rep. of Germany. |
| 2811551 | 9/1978 | Fed. Rep. of Germany. |
| 2823985 | 12/1979 | Fed. Rep. of Germany. |
| 2906576C2 | 4/1980 | Fed. Rep. of Germany. |
| 2848601C3 | 5/1980 | Fed. Rep. of Germany. |
| 886354 | 5/1981 | Fed. Rep. of Germany. |
| 2337212 | 12/1976 | France. |
| 2473340 | 7/1981 | France. |
| 55-117915 | 9/1980 | Japan. |
| 57-071407 | 5/1982 | Japan. |
| 59-179105A | 10/1984 | Japan. |
| 61-254202A | 11/1986 | Japan. |
| 61-296112A | 12/1986 | Japan. |
| 2086798 | 5/1982 | United Kingdom. |

OTHER PUBLICATIONS

Rheological and electron microscopic characterization of aqueous carboxymethyl cellulose gels—Part II: Visualization of the gel structure by freeze-fracturing—T. Müller et al., Colloid Polymer Sci., 267:230-36 (1989).

Primary Examiner—Frank Sever
Attorney, Agent, or Firm—Oliff & Berridge

[57] ABSTRACT

A cellulose dialysis membrane in the form of a hollow fiber is formed from cellulose-cuoxam solutions. An internal cavity is formed by a liquid or a gas. The membrane has a UFR of at least 4 ml/m$^2$ . h . mm Hg. The hydrogel components of the cellulose are distributed in cells with a mean free path length of 3-10 nm in the membrane wall in a log-normal distribution. The mean free path length is the distance between the cells and is determined by the freeze-etching replica method after swelling of the membrane with water. More than 65% of all the hydrogel cell interfaces of the membrane have a form factor between 1.0 and 5.0. In addition, the UFR of the membrane after storage for more than ten days in a humid atmosphere at 20° C. and 100% relative humidity is more than 50% of the value determined immediately after drying or after storage in a dry environment.

6 Claims, 1 Drawing Sheet

HOLLOW CELLULOSE DIALYSIS FIBERS

FIELD OF THE INVENTION

The invention pertains to a cellulose membrane in the form of a hollow fiber, formed of cellulose-cuoxam solutions, with the inner cavity formed by a liquid or a gas, and with a UFR of at least 4 ml/m²·h·mm Hg.

BACKGROUND

DE-OS 23 28 853 discloses hollow cellulose fibers in which the cellulose has been regenerated from cuoxam solutions. This reference assumes that structures of previously known conventional cellulose (flat) membranes made of copper oxide-ammonia-regenerated cellulose have finely distributed dialysis pores or gaps with transverse measurements on the order of 10 to 90 A (A =angstrom), approximately 30 A on the average.

It is known that cellulose is composed of crystalline and amorphous parts. When the fine gap structure of a cellulose material was compared with the concept of "pores" of a thin cellulose film, it was assumed that the crystalline part plays almost no role in the dialysis of low-molecular-weight substances, while the amorphous part actually contributes to the dialysis action. During dialysis, the amorphous parts of the cellulose swell as water molecules penetrate between the cellulose molecules. As a result, enlarged gaps appear in the molecular chains through which the low-molecular-weight substances can pass during dialysis.

It has also been assumed that hollow fibers obtained by deacetylation of cellulose triacetate also consist of cellulose and that the "pore" dimensions and the nature of the distribution of the "pores" correspond to the properties of a cellophane membrane.

Regarding the hollow cellulose fibers produced in accordance with DE-OS 23 28 853, the gap passageways in the known hollow fibers are described as having transverse measurements of 200 A at most and it is assumed, on the basis of these figures, that the average value for the size of the fine gaps has been significantly increased, so that dialysis performance was improved relative to the values previously attainable.

These known hollow fibers have been viewed under an electron microscope with a magnification of 20,000×. Fine passageways in the form of a reticulate structure with a maximum 200 A passage width have been observed not only in cross sections but also in lengthwise sections of the hollow fibers. These passageways appear to be uniformly distributed throughout the entire fiber structure and form a network of fibrils. These known hollow fibers were produced by extruding a spinning fluid of copper ammonium cellulose through an external annular spinneret and simultaneously extruding a strand of core fluid through an internal central opening located concentrically with respect to the outer annular spinneret opening. The strand consists of an uncoagulated (relative to the spinning fluid) organic liquid solvent so that a liquid thread composed of a jacket and a core is formed and drops freely under the influence of gravity through a gaseous area approximately 300 mm long to stretch the fiber and reduce the total diameter, whereupon the stretched liquid thread is guided into a coagulation area and brought into contact with an aqueous NaOH solution.

An example of the process includes a spinning fluid containing 10 wt.% cellulose, 3.6 wt.% copper, and 7 wt.% ammonium and having a viscosity of 2,000 poise (corresponding to 200 Pas).

A dialysis membrane made of regenerated cellulose is known from DE 28 23 985-A1, said membrane being distinguished by an ultrafiltration capacity of 7 to 30 ml/h m2 mm Hg (corresponding to 14 to 60 pm·s$^{-1}$·Pa$^{-1}$) and an average molecular permeability of $4 \times 10^{-3}$ to $12 \times 10^{-3}$ cm/min (corresponding to 0.65 to 2.0μ·s$^{-1}$) and by the fact that it is regenerated from cuoxam solutions.

In this known dialysis membrane, the ultrafiltration rate is not maintained under ordinary storage conditions, but decreases in a clearly measurable fashion.

In conjunction with the sterilization of cellulose membranes of this kind using moist heat treatment at 105° to 148° C., described in DE-PS 28 11 551, depending on the type of cellulose, permeability relative to water is significantly reduced. After autoclave treatment using steam alone, the UFR rate of the membrane decreases so drastically that the membrane becomes worthless. Filling the membrane with physiological saline solution is reported to prevent this decrease.

DE-PS 28 11 551 also refers to a publication of Enka Glanzstoff AG which deals with copper ammonium cellulose tubes and hollow fibers, in which the importance of treatment and storage of such membranes at 23° C. and 50% relative humidity is mentioned. In this connection, a warning is given against moistening and redrying because the outstanding permeability properties are then reduced.

German Patent 29 06 576 discloses a method of spinning hollow fibers from regenerated cellulose for semipermeable membranes by extruding a cellulose-cuoxam solution through the annular slot of a hollow fiber spinneret in aqueous caustic soda and a cavity-forming liquid through the inner bore o the hollow fiber spinneret, followed by a conventional aftertreatment. The method is characterized by the fact that the hollow fiber spinneret is submerged in the aqueous caustic soda and the ratio of the pulloff rate of the hollow fiber at the first pulloff roller to the extrusion rate of the cellulose-cuoxam solution from the annular slot of the hollow fiber spinneret is 1.00 to 1.05 and the direction of thread travel from the hollow fiber spinneret to the first pulloff roller forms an acute angle with the axis of the hollow fiber spinneret opening.

The goal of this known method is to provide a method of spinning hollow fibers from regenerated cellulose for semipermeable membranes, making it possible to generate hollow fibers with exact cross-sectional shapes predetermined by the shape of the spinnerets. The fibers manufactured in this way are also characterized by their outstanding properties such as semipermeable membranes and a mechanical strength which is not adversely affected. In particular, hollow fiber shapes with an eccentric cross section can be produced in an outstanding fashion using this known method. An arrangement with the hollow fiber spinneret in the bottom of the coagulation tank is assigned less significance which owes to technical problems in sealing and spinning.

A method of producing a hollow fiber from regenerated copper ammonium cellulose with an axially located cylindrical bore is known from European Patent 0 076 442, said bore extending over the length of the fiber and being filled with gas in the following steps:

1) Extruding a spinning solution made of copper ammonium cellulose through an annular opening, whereby a fiber extrudate is formed with a hole, while gas is blown simultaneously into the fiber extrudate into the bore of the fiber through a blowing tube located in the center of the annular opening;

2) Dropping the fiber in free fall in an air space and allowing it to submerge essentially perpendicularly to a depth of 2 to 20 mm, preferably up to a depth of 30 mm, below the surface of a coagulation bath, solely under the influence of the downward force during free fall;

3) Guiding the fiber extrudate through the coagulation bath, whereby a hollow fiber is obtained with an axially disposed cylindrical bore; and 4) Refining and drying the hollow fibers thus produced.

The long air gap required for this purpose necessitates spinning solutions of high viscosity. In addition, the requirement that the fiber in free fall submerges itself up to 20 mm deep in the coagulation bath poses considerable difficulties.

Comprehensive studies of known hollow dialysis fibers of copper ammonium cellulose have shown that the adverse affects on the UFR are clearly dependent on the storage conditions. Thus, it has been found that when such hollow fibers are stored at relatively high humidity, the UFR decreases to about 20% of the original value in less than ten days.

When stored in the swollen (wet) state, there is no decrease in the UFR. After redrying of such membranes, however, the UFR falls to values similar to those seen for storage at 100% humidity. Hence, storage in the wet state is not practical because the storage time must remain limited in order to prevent the risk of microbiological and chemical decomposition processes in particular.

SUMMARY OF THE INVENTION

A goal of the present invention is to produce cellulose membranes in the form of hollow fibers made of cellulose-cuoxam solutions, in which the UFR, even under unfavorable storage conditions, changes so little that the required permeability properties (at least 4 ml/m²h mm Hg) are retained.

This and other goals are achieved by a hollow cellulose fiber having the hydrogel components of the cellulose distributed in cells with a mean free path length, as determined by the freeze-etching replica method after swelling of the membrane with water, of 3–10 nm in the membrane wall in a log-normal distribution, the mean free path length being the space between the cells, and the form factor of more than 65% of the total interfaces of the hydrogel cells being between 1.0 and 5.0 and the UFR, following storage for more than ten days in a damp atmosphere at 20° C. and 100% relative humidity, being more than 50% of the value obtained immediately after drying or after storage in a dry environment.

DETAILED DESCRIPTION OF THE PREFERRED EMBODIMENTS

Figure 1:
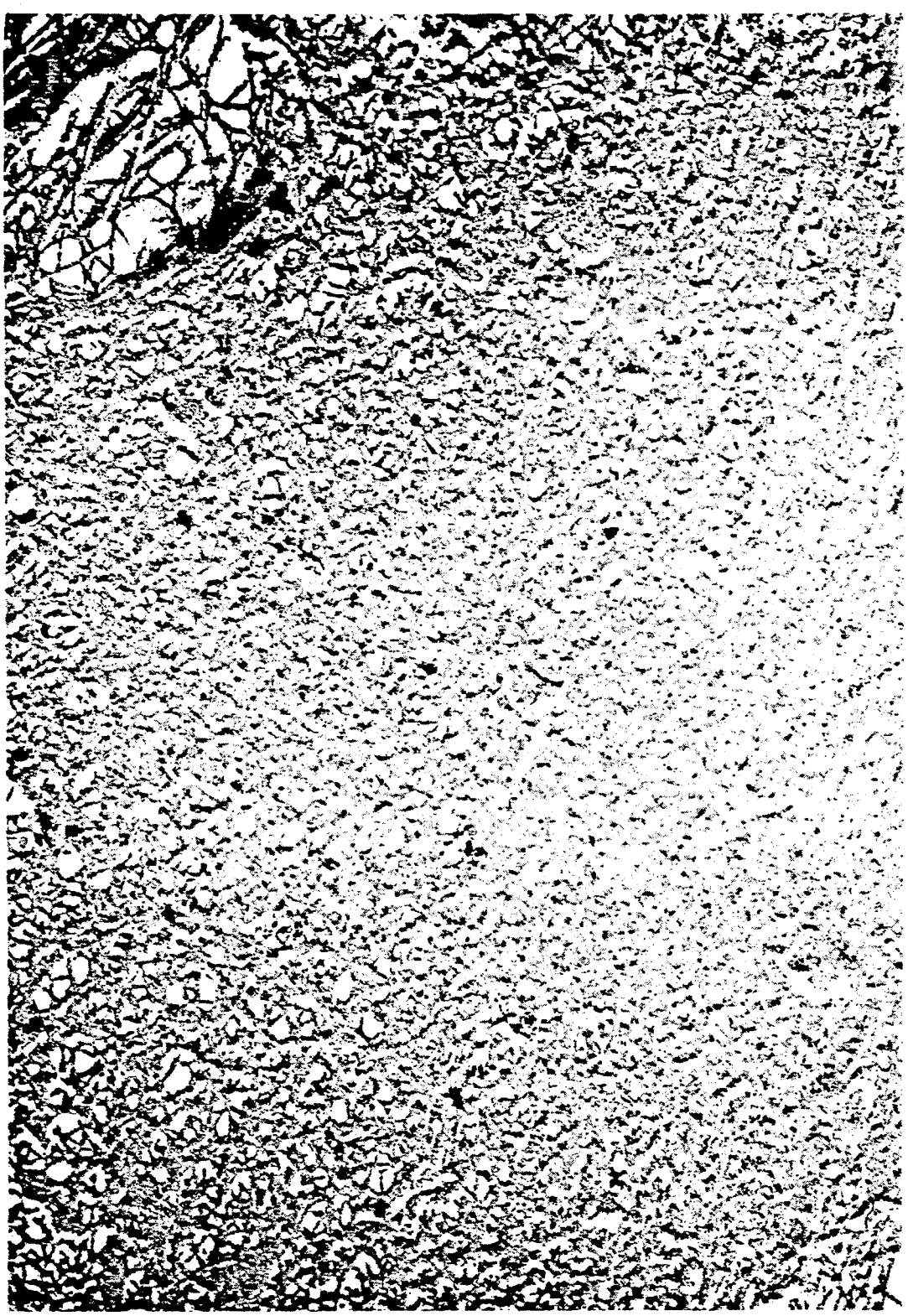
FIG. 1 is a TEM photomicrograph of an imprint of an hydrogel.

The previously known measurements of the "pore structure" of cellulose dialysis membranes are contradictory and inaccurate. This is because the resolution is insufficient for REM recordings and sample preparation for TEM [transmission electron microscope] recordings must take place under conditions that involve a change in the sample. In particular, the hydrogel component responsible for the transport characteristics of a cellulose membrane cannot be measured without changing the material. Although methods for embedding swollen cellulose membranes containing aqueous polymers have recently become possible, the resolution of TEM recordings of such embeddings is not good enough to provide exact information about the hydrogel (pore) structure of the cellulose membranes.

By preparing replicas, in other words by using imprints, surface structures were made visible even before the introduction of the scanning electron microscope. An important advance in modern technique is the combination with freeze-etching methods by which even aqueous samples can be studied. The resolution has been significantly improved by using high-vacuum systems and electron beam evaporation sources.

In addition, an artifact-free freezing process is very important, assuming very high freezing rates (typically $\geq 15{,}000$ K/s) in which no ice crystals form but amorphous "vitrified" ice is produced instead.

The typical steps in this technique are the following:
1. Ultrafast freezing of the aqueous sample, for example with liquid propane or melting nitrogen ($MN_2$ slush).
2. Transfer of the sample to the high-vacuum system.
3. Breaking under vacuum and constant cooling at temperatures of $\leq -100°$ C.
4. Removal of frozen water in vacuum through $H_2O$-sublimation (etching).
5. Shadowing with Pt/C to show the relief.
6. Vacuum deposition of a C-carrier support layer.
7. Thawing the sample and dissolving the original sample in $H_2SO_4$.
8. Cleaning the remaining replica (several times in $H_2O$).
9. Transfer to TEM preparation grids.

The TEM pictures permit reproductions of the structure inside a membrane wall in an $H_2O$ swollen state. At high resolution the cellulose network in the gel state is shown. The bright areas can be viewed as the permeable areas (pores) in the membrane.

The freeze-etching replica method provides unambiguous information about the hydrogels, their distribution, size and shape. The method is described for example for carboxymethylcellulose gels in Coll. Polym. Sci. 267, pages 230–236, 1989. Then the dialysis membranes swollen with water are initially frozen in a very short time. To obtain measurements that can be later used, considerable freezing rates are required, at least 15,000 K/s, to avoid formation of ice crystals and damage to the sample by split artifacts. Freezing rates of this order are possible for example with liquid propane using the jet freezing method.

The frozen water is removed (etched) by sublimination in a high vacuum and the sample is shadowed with platinum and carbon. The sample is then vacuum-deposited with more carbon to stabilize it. After the cellulose is removed, the imprint remains and is photographed under the TEM.

The photo thus obtained is studied at a final magnification of 1:200,000 in an automatic image evaluation device, for example the "Quantimet 970," to determine the size, distribution, and shape of the hydrogel imprint (FIG. 1). The mean free path length was determined in this measurement to be 5.2 nm, with 69% of all the interfaces having a form factor of between 1.0 and 5.0.

Although, as we have shown, other liquids are also suitable for forming the hollow space inside, the aging resistance is especially good when the inner cavity is formed by water or an aqueous solution.

It is also especially advantageous to use gases to form the inner space. It is advantageous for high resistance to aging, for the inner cavity to be formed by a gas with at least 80% relative humidity at room temperature.

The subject of the invention is also a method for making hollow cellulose fibers according to the invention by spinning a cellulose-cuoxam solution at a temperature of 20° C., said solution containing 5-9 wt.% cellulose, 2.3-2.8 wt.% Cu, and 7.5-9 wt.% ammonia, possibly with additives, passing it through a hollow fiber annular slot spinneret through a precipitation bath using a liquid or a gas to form the inner cavity with the precipitation bath containing 10 to 15 wt.% of an alkali hydroxide, by washing in acid baths and waters, treatment with softeners, and drying at 105° C. and winding up the hollow fiber, where the spinning solution has a viscosity of 20-35 Pas and the hollow fiber annular slot spinneret is located within the precipitation bath at a maximum of 2.5 cm above the surface of the precipitation bath.

When the internal cavity is formed by water or gases with at least 80% relative humidity at room temperature, it has proven to be advantageous for the hollow fiber spinneret to be located in the bottom of the coagulation tank which contains the precipitation bath and the hollow thread is spun upward.

For special formation and stabilization of the hydrogel cells, additives, possibly mixed with one another, may be added to the spinning solution. The following compounds are useful as additives:

Monovalent or polyvalent alcohols with 1-10 C atoms, cycloaliphatic alcohols, polyvinyl alcohol, polyvinylpyrrolidone, hydroxyethylcellulose, lactoproteins, dimethylformamide, as well as polyethylene glycol with an average molecular weight of 100-3,000 and/or silica gels.

The invention will now be described in greater detail with reference to the following examples.

A cellulose spinning solution is prepared by the cuoxam method, with a cellulose content of 6.50 wt.%, an $NH_3$ content of 8.00 wt.%, and a Cu content of 2.80 wt.%. This solution is filtered, degassed, and then spun through the annular gap of a hollow fiber spinneret into a coagulation bath with an NaOH concentration of 115 g/liter at a pulloff rate of 56 m/min. The viscosity of the spinning solution is 25 Pas. The hollow fiber spinneret is located 1.2 cm above the precipitation bath surface. Isopropylmyristate is fed continuously into the central spinneret bore during the spinning process to stabilize the lumen. A capillary membrane is produced which, after formation of the regenerate cellulose, is washed and then processed in a softener bath with 135 g/liter of glycerine and 350 g/liter of isopropanol. The capillary membrane is dried in air at 90° C. The following membrane properties are obtained:

| | | |
|---|---|---|
| Outside diameter | 232 μm | |
| Inside diameter | 200 μm | |
| Tear strength | 103 × 10$^3$ cN/mm$^2$ | |
| Elongation to rupture | 28% | |
| Ultrafiltration rate (UFR) | 29.0 ml/m$^2$ · h · mm Hg | |

This material is subjected to a climate test under the following conditions.

| | |
|---|---|
| Duration | 13 days |
| Relative humidity | 99% (in nitrogen) |
| Temperature: | 20° C. |

After the test, a UFR of 19.1 ml/m$^2$·h·mm Hg is measured, in other words 65.8% of the starting value of 29 ml/m$^2$·h·mm Hg.

EXAMPLE 2

A cellulose-cuoxam solution with a cellulose concentration of 9.3 wt.%, an $NH_3$ content of 8.5 wt.%, and 3.9 wt.% Cu is prepared and degassed. At the same time, a solution is prepared from polyethylene glycol 400, aqueous ammonia with an $NH_3$ content of 280 g/1, and water, with a polyethylene glycol content of 35.1 wt.% and an $NH_3$ content of 9.47 wt.%. The cellulose solution and the polyethylene glycol solution is fed by metering pumps to a dynamic mixer and homogenized. The resultant spinning solution contains 6.5 wt.% cellulose, 8.0 wt.% $NH_3$, and 2.8 wt.% Cu and is then spun as described in Example 1. The distance to the precipitation bath surface in this case however is 2.4 cm. The viscosity of the spinning solution in this case is 22 Pas. The softener bath however, in contrast to the concentrations described in Example 1, contains 25 g/l glycerine with an isopropanol content of 400 g/1. The following membrane data are obtained:

| | |
|---|---|
| Outside diameter | 240 μm |
| Inside diameter | 200 μm |
| Tear strength | 80 × 10$^3$ cN/mm$^2$ |
| Elongation to rupture | 28.5% |
| Ultrafiltration rate (UFR) prior to climate test | 12.3 ml/m$^2$ · h · mm Hg |
| Ultrafiltration rate (UFR) after climate test | 7.4 ml/m$^2$ · h · mm Hg |

EXAMPLE 3

A cellulose-cuoxam solution with a cellulose content of 8.8 wt.%, an $NH_3$ content of 6.3 wt.%, and a Cu concentration of 3.85 wt.% is prepared and degassed. The viscosity of the spinning solution is 34 Pas. This spinning solution is spun through the annular gap of a hollow fiber spinneret into a coagulation bath containing 115 g/1 of NaOH at 25° C. with a pulloff rate of 56 m/min. The distance to the surface of the precipitation bath is 1.9 cm. The central spinneret bore is supplied with water as an internal fluid. The result, a capillary membrane, which after decoppering, washing, and treatment with softeners, in a bath with 25 g/1 glycerine, 300 g/1 isopropanol, and water, is wound wet onto a reel. The capillary membrane is cut into segments and, after removal of the internal fluid, is processed in two dip baths, with a first bath containing 90% aqueous isopropanol and the second bath containing 90% aqueous isopropanol and 100 g/1 of glycerine. The residence times are five minutes each. Then the capillary membranes are dried at 40° C. air temperature. The following membrane data are obtained:

| | |
|---|---|
| Outside diameter | 222 μm |
| Inside diameter | 200 μm |
| Tear strength | 128 × 10³ cN/mm² |
| Elongation to rupture | 29% |
| Ultrafiltration rate (UFR) before climate test | 9.10 ml/m² · h · mm Hg |
| Ultrafiltration rate (UFR) after climate test | 5.7 ml/m² · h · mm Hg |

What is claimed is:

1. A cellulose dialysis membrane in the form of a hollow fiber formed from cellulose-cuoxam solutions, with an internal cavity formed by a liquid or a gas and with a UFR of at least 4 ml/m²·h·mm Hg, wherein:
   hydrogel components of the cellulose are distributed in cells with an average free path length, as determined by a freeze-etching replica method after swelling of the cellulose membrane with water, of 3–10 mm in the membrane wall in a log-normal distribution, the average free path length being the distance between the cells;
   more than 65% of hydrogel cell interfaces in the membrane have a form factor between 1.0 and 5.0; and
   said membrane having properties for enabling its UFR following storage for more than ten days in a humid atmosphere at 20° C. and 100% relative humidity to be maintained at more than 50% of the value obtained immediately after drying or after storage in a dry environment.

2. The cellulose dialysis membrane according to claim 1, wherein water or an aqueous solution is used to form the internal cavity.

3. The cellulose dialysis membrane according to claim 1, wherein a gas with at least 80% relative humidity at room temperature is used to form the internal cavity.

4. A method for manufacturing the hollow cellulose fibers of claim 1, comprising:
   spinning a cellulose-cuoxam solution containing 5 to 9 wt.% cellulose, 2.3–2.8 wt.% Cu, and 7.5–9 wt.% ammonia and having a viscosity of from about 20 to about 35 PAS, at a temperature of 20° C. through a hollow fiber annular slot spinneret, in a precipitation bath containing 10 to 15 wt.% of an alkali hydroxide, using a liquid or a gas to form the internal cavity, the hollow fiber annular slot spinneret being located within the precipitation bath at a maximum of 2.5 cm above the precipitation bath surface;
   washing in acid baths and in water;
   treating with softeners;
   drying at 105° C.; and
   winding the hollow fiber.

5. The method according to claim 4, wherein the hollow fiber spinneret is located in the bottom of a coagulation tank containing the precipitation bath and the hollow fiber is spun upward.

6. The method of claim 4, wherein the cellulose-cuoxam solution further contains additives.

* * * * *